United States Patent [19]

Seki et al.

[11] Patent Number: 5,315,524
[45] Date of Patent: May 24, 1994

[54] INTERACTIVE TYPE AUTOMATIC PROGRAMMING METHOD INCLUDING AUTOMATIC RE-EXECUTION OF PROGRAM STATEMENTS

[75] Inventors: Masaki Seki, Tokyo; Takashi Takegahara, Hachioji; Masatoshi Nakajima, Oshino, all of Japan

[73] Assignee: Fanuc Ltd., Minamitsuru, Japan

[21] Appl. No.: 773,557

[22] PCT Filed: Mar. 8, 1991

[86] PCT No.: PCT/JP91/00301
 § 371 Date: Nov. 8, 1991
 § 102(e) Date: Nov. 8, 1991

[87] PCT Pub. No.: WO91/14215
 PCT Pub. Date: Sep. 19, 1991

[30] Foreign Application Priority Data
 Mar. 8, 1990 [JP] Japan .................................. 2-54915

[51] Int. Cl.$^5$ .................................. G06F 15/46
[52] U.S. Cl. ........................ 364/474.25; 364/192; 364/474.27
[58] Field of Search ........ 364/474.22–474.27, 364/191–193, 140, 184; 395/275, 500, 575

[56] References Cited

U.S. PATENT DOCUMENTS

| | | | |
|---|---|---|---|
| 4,794,514 | 12/1988 | Hideaki et al. | 364/474.22 |
| 4,924,403 | 5/1990 | Kawamura et al. | 364/474.22 |
| 4,926,311 | 9/1990 | Matsumura et al. | 364/474.27 |
| 5,006,977 | 4/1991 | Seki et al. | 364/474.26 |
| 5,021,966 | 6/1991 | Seki et al. | 364/474.26 |
| 5,051,676 | 9/1991 | Seki et al. | 364/191 |
| 5,056,332 | 11/1991 | Seki et al. | 364/474.22 |
| 5,159,558 | 10/1992 | Seki et al. | 364/474.26 |
| 5,218,525 | 6/1993 | Amasaki et al. | 364/140 |

FOREIGN PATENT DOCUMENTS

WO90/00764  1/1990  PCT Int'l Appl. .

Primary Examiner—Jerry Smith
Assistant Examiner—Jim Trammell
Attorney, Agent, or Firm—Staas & Halsey

[57] ABSTRACT

An interactive type automatic programming method which facilitates the detection of errors in a part program and permits only a required portion of the modified/edited part program to be re-executed. First, part program statements are displayed on a screen, and every time the operator inputs a one statement execution command (S4) a programming system executes one program statement and displays the result of the execution on the screen (S6, S7). When an executed part program statement is found to be erroneous, the operator inputs a modification command (S5), moves the cursor to specify the program statement to be modified, inputs a program modification command (S13, S15), and then corrects the program statement. In response to an operator's input of a re-execution command (S18), the programming system re-executes only a required portion of the part program beginning with the modified part program statement and ending with a part program statement to be executed next (S19).

15 Claims, 5 Drawing Sheets

FIG. 7

```
     >>>FAPT Execution<<<

PART. 123. @TEST    | O0123 (TEST)
  P1=5. 5              | P1=5. 0. 5. 0
  P2=10. 10            |
  FROM. P1             |
  P2                   |
  FINI
  PEND

ONE STATEMENT EXECUTION   MODIFICATION   RE-EXECUTION
```

FIG. 8

```
     >>>FAPT Execution<<<

PART. 123. @TEST
  P1=0. 0              | P1=0. 0. 0. 0
  P2=10. 10            | P2=10. 0. 10. 0
  FROM. P1
  P2
  FINI
  PEND

ONE STATEMENT EXECUTION   MODIFICATION   RE-EXECUTION
```

INTERACTIVE TYPE AUTOMATIC PROGRAMMING METHOD INCLUDING AUTOMATIC RE-EXECUTION OF PROGRAM STATEMENTS

TECHNICAL FIELD

The present invention relates to an interactive type automatic programming method.

BACKGROUND ART

It is conventionally known to execute a part program by means of an NC automatic programming system to automatically prepare an NC program. A conventional programming system is arranged to execute a part program from the beginning to the program end for NC program preparation, in response to manual input of an execution command. The NC program thus prepared, i.e., the result of execution of the part program, is checked by an operator, and if an error exists in the part program, the erroneous portion of the part program is modified/edited by the operator. Then, the modified/edited part program is executed again by the programming system from the beginning to the end of the program.

According to the conventional method described above, it is difficult to learn the result of the execution of each of program statements constituting the part program, and much effort is required to find an erroneous portion of the part program. Moreover, since the modified/edited part program is re-executed from the beginning to the end thereof, the execution time of the part program is long, and therefore, much time is required for the preparation of an NC program.

DISCLOSURE OF THE INVENTION

An object of the present invention is to provide an interactive type automatic programming method which facilitates the detection of an erroneous portion of a part program, and which permits only a required portion of the modified/edited part program to be re-executed.

To achieve the above object, an interactive type automatic programming method according to the present invention comprises the steps of: automatically displaying a part program to be executed, the part program including a plurality of part program statements; automatically executing a corresponding one of the part program statements each time an execution command is manually input, and automatically displaying the result of the execution of the corresponding one part program statement; and automatically re-executing only a required portion of the part program when a re-execution command is manually input, the part program being a portion manually modified before the re-execution command is manually input.

According to the present invention, as mentioned above, not only the part program to be executed is displayed, but also the execution result is displayed each time a part program statement is executed. Therefore, the operator can instantly locate an erroneous portion of the part program when it is determined that the part program contains an error, on the basis of the execution result of the part program. Moreover, since only a required portion of the modified part program is re-executed, the execution time of the part program is shortened.

BRIEF DESCRIPTION OF THE DRAWINGS

FIG. 7 is a diagram showing a CRT screen at the time the second program statement is modified thereon; and FIG. 8 is a diagram showing a CRT screen at the time the result of the re-execution is displayed thereon.

BEST MODE OF CARRYING OUT THE INVENTION

Figure 1:
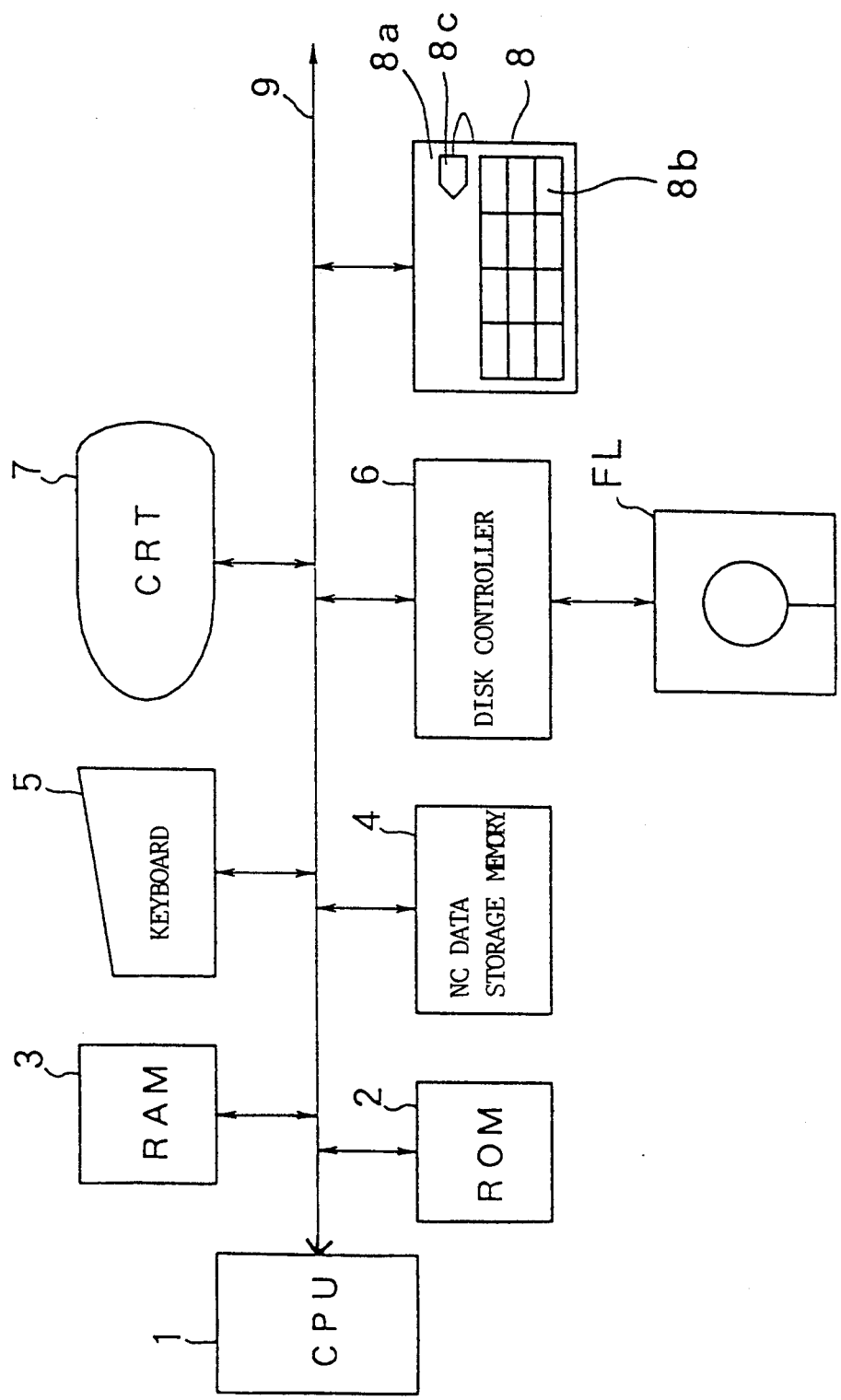
FIG. 1 is a block diagram of a principal part of an automatic programming system for embodying a programming method according to one embodiment of the present invention.
Figure 2:
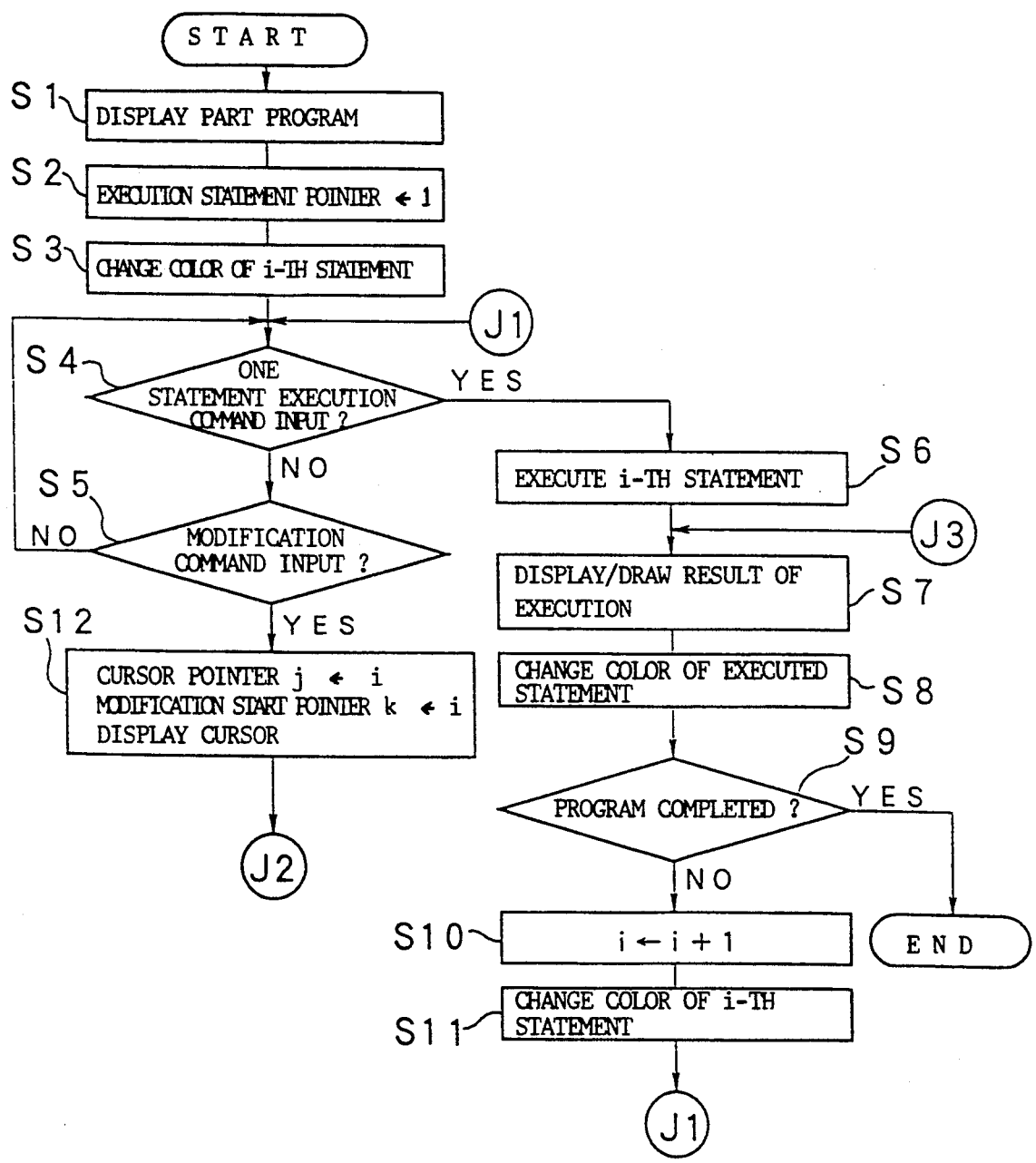
FIG. 2 is a flowchart showing part of a part program execution process carried out in the programming method of the embodiment of the invention.
Figure 3:
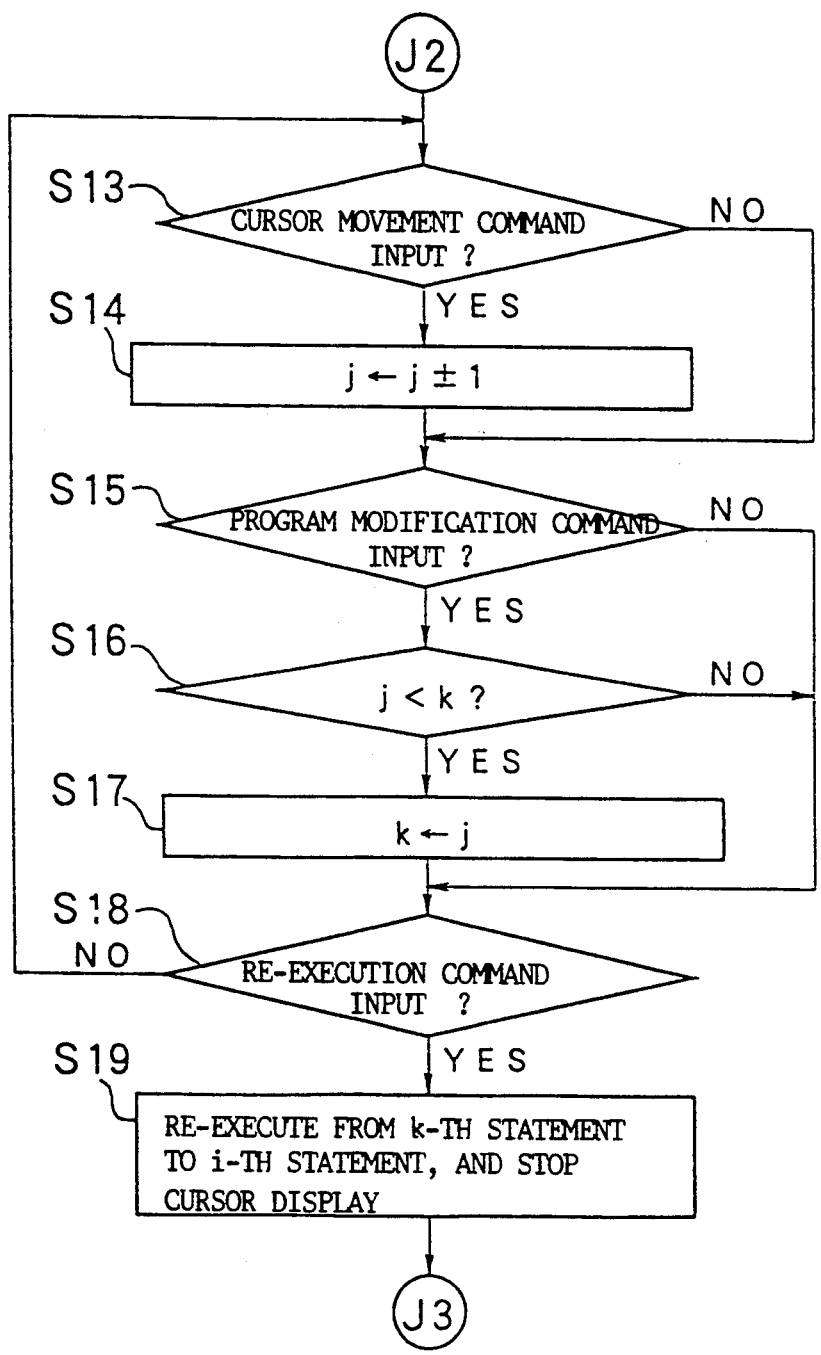
FIG. 3 is a flowchart showing the remaining part of the part program execution process.

Referring to FIG. 1, an automatic programming system comprises a processor 1, a read-only memory (ROM) 2 storing a control program for the operation control of the programming system, a random-access memory (RAM) 3 for storing a system program, part program, various data, etc., and a nonvolatile RAM 4 for storing a prepared NC program. The programming system further comprises a keyboard 5, a disk controller 6 arranged to be loaded with a floppy disk FL, a graphic display (CRT) 7, and a tablet 8. The elements 2 to 8 are connected to the processor 1 via busses 9.

More specifically, the keyboard 5 includes character keys, number keys, cursor keys, various command keys including a program modification command key mentioned later, and first to third function keys associated respectively with the items "One Statement Execution," "Modification," and "Re-execution" displayed on the graphic display screen 7a of the CRT 7. Various system programs and a prepared part program are previously stored in the floppy disk FL. The tablet 8 has a screen area 8a corresponding to the CRT screen 7a, a menu list 8b including various menu items, and a tablet cursor 8c movable over the screen area 8a and the menu list 8b. The tablet is so arranged that a required one of the items displayed on the CRT screen can be specified by moving the tablet cursor 8c on the screen area 8a to cause an interlocked movement of the CRT cursor on the CRT screen 7a, and that a required menu item can be specified by moving the tablet cursor 8c on the menu list 8b. The tablet 8 is arranged to permit the thus specified item to be pick-input.

Referring now to FIGS. 2 to 8, the operation of the programming system will be described.

When the programming system is set in operation, the system program and the part program are transferred from the floppy disk FL to the RAM 3 and loaded therein, under the control of the processor 1.

Figure 4:
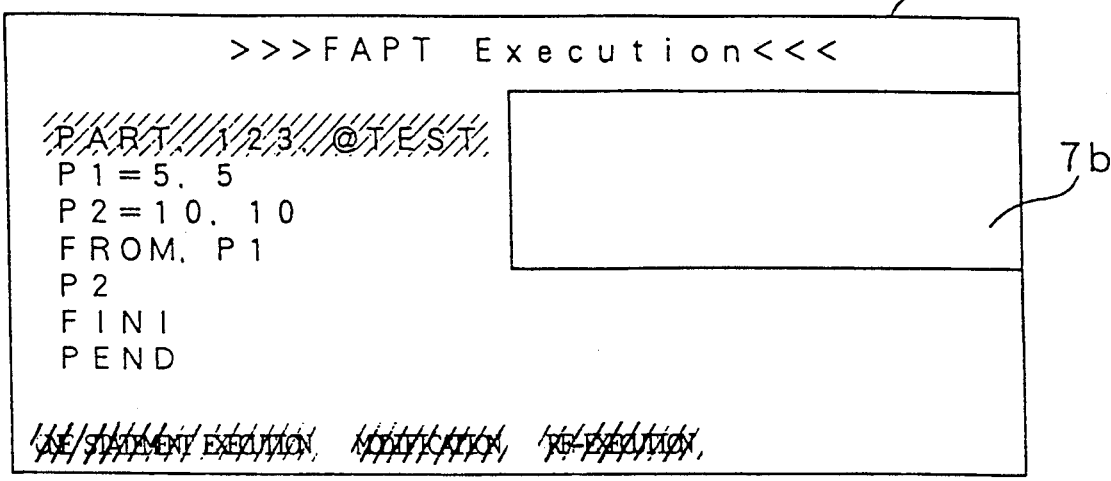
FIG. 4 is a diagram showing a CRT screen at the time the first program statement of a part program is displayed thereon in a different color from that of the other program statements.

Then, when the operation mode of the programming system is set in "One Part Program Statement Execution Mode" by an operator's keyboard operation, a plurality of part program statements constituting the part program are displayed on the CRT screen 7a, together with the caption "FAPT Execution" and the items "One Statement Execution," "Modification" and "Re-execution," under the control of the processor 1 (Step S1). In the present embodiment, the part program statements are displayed on the left-hand portion of the CRT screen 7a, as shown in FIG. 4. At this time, the part program statements are shown in a first color.

Next, the processor 1 sets the value "1" in an execution statement pointer i accommodated in the processor (Step S2), and sends a command to the CRT 7 to change the color of the i-th part program statement to be executed next, specified by the value "i", from the first color to a second color (Step S3). Whereupon, the first program statement, which is to be executed next, is shown in a distinguishable manner from the other program statements, as shown in FIG. 4.

Figure 5:
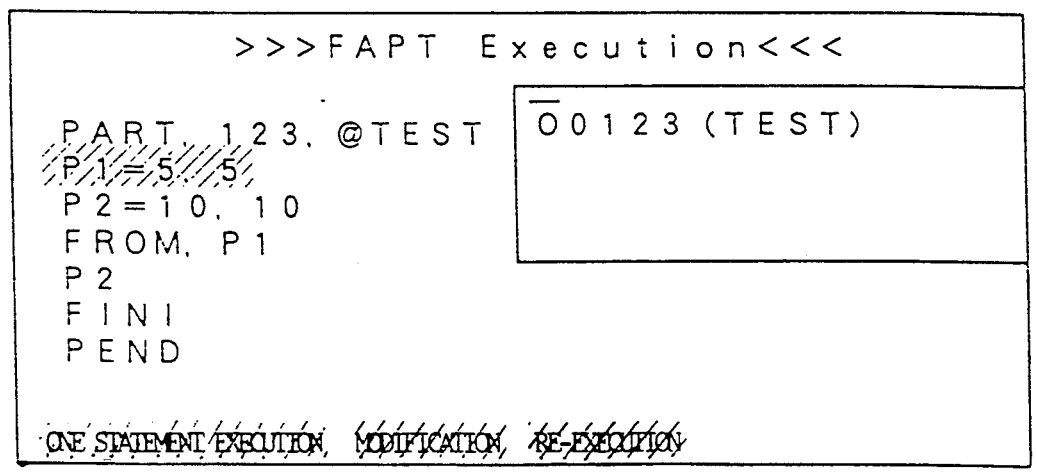
FIG. 5 is a diagram showing a CRT screen at the time the result of execution of the first program statement is displayed thereon.
Figure 6:
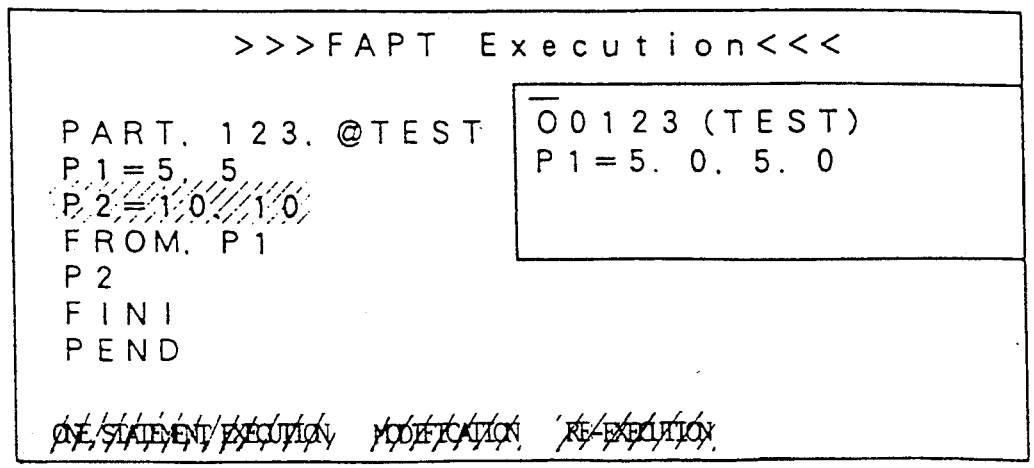
FIG. 6 is a diagram showing a CRT screen at the time the result of execution of the second program statement is displayed thereon.

The processor 1 then stands by for an operation of the first or second function key associated with the item "One Statement Execution" or "Modification." If, then, the operator operates the first function key, the processor 1 determines that a one statement execution command has been input (Step S4), executes the i-th part program statement specified by the pointer value "i" (Step S6), and displays the result of the execution at an execution result display field 7b in the upper right portion of the CRT screen, in a distinguishable manner from the part program (Step S7). In the illustrated example, the result of execution of the first part program statement "PART, 123, @ TEST", that is, "00123(TEST)", is displayed (FIG. 5). Generally, NC data, definition data, or a tool path is displayed as the execution result.

Subsequently, the color of the executed i-th part program statement specified by the value "i" (in this case, the first program statement) is changed from the second color to a third color (Step S8), whereby the executed program statement is shown distinctly from the other program statements. The processor 1 further determines whether or not the program end has been reached (Step S9). If the program end is not determined, the value of the execution statement pointer i is incremented by "1" (Step S10), the color of the i-th part program statement specified by the updated pointer value "i" (in this case, the second part program statement (FIG. 5)) is changed from the first color to the second color (Step S11), and the processor stands by for an operation of the first or second function key.

Then, referring to the execution result displayed on the CRT screen, the operator determines whether or not the executed part program statement contains an error, and if no error exists, operates the first function key. In this case, the processor 1 executes the above-described process upon detecting input of the one statement execution command in Step S4. A similar process is carried out every time a one statement execution command is input, and when the program end is detected in Step S9, the execution of the part program is ended.

When an error is found in one or more executed part program statements, on the basis of the result of execution of the part program statement (in the present embodiment, errors in a plurality of part program statements can be successively corrected, as described later), the operator operates the second function key. In this case, the processor 1 detects input of a modification command in Step S5, and sets the execution statement pointer value "i" in a cursor pointer j and in a modification start pointer k (Step S12). As a result, the cursor is displayed at the j-th part program statement specified by the cursor pointer value "j". For example, if the second function key is operated after the execution of the second program statement "P1=5,5" and before the execution of the third program statement "P2=10,10", the execution statement pointer value at that time, i (=3), is set in the cursor pointer j, and the cursor is displayed at the third program statement.

After the pointer value "i" is set in the cursor pointer j and the modification start pointer k, the processor 1 stands by for an operator's operation of the cursor key, the program modification command key, or the third function key associated with the item "Re-execution."

Every time the operator operates the up arrow cursor key in an attempt to specify the part program statement to be modified, the processor 1 detects input of the cursor movement command and decrements the cursor pointer value "j" by "1" (Steps S13 and S14), and hence the cursor moves to the preceding program statement. On the other hand, each time the down arrow cursor key is operated, input of the cursor movement command is detected and the cursor pointer value "j" is incremented by "1" (Steps S13 and S14), whereby the cursor moves to the subsequent program statement. For example, if the up arrow cursor key is operated once before the execution of the third program statement "P2=10,10" with the intention of correcting the second program statement "P1=5,5", the cursor moves from the third program statement to the second program statement (FIG. 7).

If the operator operates the program modification command key, the processor 1 detects input of the program modification command in Step S15, and determines whether or not the cursor pointer value "j" is smaller than the modification start pointer value "k" (Step S16). If the value "j" is smaller than the value "k", the processor 1 sets the cursor pointer value "j" in the modification start pointer k (Step S17). As a result, a value specifying the earliest one of the modified part program statements in the part program is stored in the modification start pointer k. The processor 1 then determines whether or not the third function key is operated (Step S18). If, on the other hand, the cursor pointer value "j" is not smaller than the modification start pointer value "k", the program proceeds directly to Step S18 for detecting an operation of the third function key, without varying the modification start pointer value "k". If the third function key is not being operated, the program returns to Step S13. Then, the processor 1 stands by for an operation of the cursor key, program modification command key, or third function key.

During this time, the operator is allowed to input data for correcting the erroneous program statement through the keyboard 5. For example, with the cursor positioned at the second program statement, the operator may operate the keyboard 5 to change the second program statement "P1=5,5" to "P1=0,0". Whereupon, the processor 1 displays the modified program statement "P1=0,0" on the CRT screen, in accordance with the keyboard operation (FIG. 7). The operator can modify another program statement, if necessary. Namely, the operator may operate the cursor key to move the cursor and thereby specify the program statement to be modified, operate the program modification command key, and then input data for modifying the program statement. In this case, the processor 1 operates in the manner described above.

If the operator operates the third function key, the processor 1 detects input of a re-execution command (Step S18), and only a required portion of the part program which begins with the part program statement specified by the modification start pointer value "k" and ends with the part program statement specified by the execution statement pointer value "i" (for example, the second and third program statements) is re-executed and at the same time the cursor for indicating the program statement to be modified is lost to view (Step S19). Subsequently, in Step S7, the processor 1 displays/draws the result of the re-execution on the CRT display, as shown in FIG. 8, and then stands by for further input of the execution command or modification command (Steps S4 and S5).

Thereafter, modification and re-execution of the program statements are repeated as required, on the basis of the results of successive execution of the program statements, and when the program end is determined in Step S9, the execution of the part program is ended.

The present invention is not limited to the above-described embodiment and various modifications are possible.

For example, although in the above embodiment, errors in a plurality of executed part program statements can be successively corrected when a modification command is input, only one part program statement may be made modifiable when the modification command is input. In this case, Step S15 for detecting input of the program modification command, Step S16 for the pointer value comparison, and Step S17 for varying the modification start pointer value are unnecessary. Furthermore, a portion of the part program beginning with the program statement specified by the cursor pointer value "j" has only to be re-executed.

In the foregoing embodiment, a portion of the part program beginning with the program statement specified by the modification start pointer value "k" and ending with the program statement specified by the execution statement pointer value "i" is re-executed, but re-execution of the part program may be carried out only for a portion ending with the executed program statement or a portion beginning with the first program statement. In the latter case, Steps S12 through S17 for determining the pointer value "k" which specifies the earliest one of the modified program statements in a part program can be omitted.

Although in the embodiment, the function keys are used to input the one statement execution command, the modification command and the re-execution command, the embodiment may be modified such that the commands are input by means of the tablet cursor 8c.

Moreover, in the above embodiment, the program statement to be executed next, the executed program statements, and the other program statements are displayed in different colors, but these three types of program statements may be displayed in different forms.

We claim:

1. An interactive automatic programming method, comprising the steps of:
   (a) automatically displaying a part program to be executed, the part program including a plurality of part program statements;
   (b) automatically executing a corresponding one of the plurality of part program statements each time an execution command is manually input;
   (c) automatically displaying a result of the execution of the corresponding part program statement in step (b);
   (d) manually modifying at least one of the part program statements;
   (e) automatically determining a re-execution portion of the part program to be re-executed in dependence upon said modifying in step (d); and
   (f) automatically re-executing only the re-execution portion of the part program determined in step (e) when a re-execution command is manually input.

2. An interactive automatic programming method according to claim 1, wherein the re-execution portion determined in step (e) begins with a manually modified part program statement and ends with a part program statement that was executed last before the re-execution command is manually input.

3. An interactive type automatic programming method according to claim 2, wherein a part program statement to be executed next and other part program statements are displayed in different colors.

4. An interactive automatic programming method according to claim 2, wherein a part program statement to be executed next and other part program statements are displayed in different forms.

5. An interactive automatic programming method according to claim 1, wherein the re-execution portion determined in step (e) begins with a manually modified part program statement and ends with a part program statement immediately following a part program statement that was executed last before the re-execution command is manually input.

6. An interactive type automatic programming method according to claim 3, wherein a part program statement to be executed next and other part program statements are displayed in different colors.

7. An interactive automatic programming method according to claim 5, wherein a part program statement to be executed next and other part program statements are displayed in different forms.

8. An interactive automatic programming method according to claim 1, wherein the re-execution portion determined in step (e) begins with an initial part program statement and ends with a part program statement that was executed last before the re-execution command is manually input.

9. An interactive type automatic programming method according to claim 8, wherein a part program statement to be executed next and other part program statements are displayed in different colors.

10. An interactive automatic programming method according to claim 8, wherein a part program statement to be executed next and other part program statements are displayed in different forms.

11. An interactive automatic programming method according to claim 1, wherein the re-execution portion determined in step (e) begins with an initial part program statement and ends with a part program statement immediately following a part program statement that was executed last before the re-execution command is manually input.

12. An interactive type automatic programming method according to claim 11, wherein a part program statement to be executed next and other part program statements are displayed in different colors.

13. An interactive automatic programming method according to claim 11, wherein a part program statement to be executed next and other part program statements are displayed in different forms.

14. An interactive type automatic programming method according to claim 1, wherein a part program statement to be executed next and other part program statements are displayed in different colors.

15. An interactive type automatic programming method according to claim 1, wherein a part program statement to be executed next and other part program statements are displayed in different forms.

* * * * *

UNITED STATES PATENT AND TRADEMARK OFFICE
CERTIFICATE OF CORRECTION

PATENT NO. : 5,315,524

DATED : May 24, 1994

INVENTOR(S) : Masaki Seki et al

It is certified that error appears in the above-indentified patent and that said Letters Patent is hereby corrected as shown below:

Col. 3, line 11, after "pointer" delete "i" and insert --$\underline{i}$--;

line 43, after "pointer" delete "i" and insert --$\underline{i}$--;

Col. 4, line 1, after "pointer" delete "j" and insert --$\underline{j}$--;

line 2, after "pointer" delete "k" and insert --$\underline{k}$--;

line 9, after "pointer" delete "j" and insert --$\underline{j}$--;

UNITED STATES PATENT AND TRADEMARK OFFICE
CERTIFICATE OF CORRECTION

PATENT NO. : 5,315,524
DATED : May 24, 1994
INVENTOR(S) : Masaki Seki, et al

It is certified that error appears in the above-indentified patent and that said Letters Patent is hereby corrected as shown below:

line 12, after "pointer" delete "j" and insert --$\underline{j}$--, and after "pointer" delete "k" and insert --$\underline{k}$--;
      line 41, after "pointer" delete "k" and insert --$\underline{k}$--; and
      line 44, after "pointer" delete "k" and insert --$\underline{k}$--.
Col. 6, line 37, delete "colors" and insert --forms--;
      line 51, delete "colors" and insert --forms--; and
      line 66, delete "colors" and insert --forms--.
Col. 8, line 6, delete "forms" and insert --colors--.

Signed and Sealed this

Twenty-seventh Day of September, 1994

Attest:

BRUCE LEHMAN

Attesting Officer

Commissioner of Patents and Trademarks